United States Patent [19]

Konietzni et al.

[11] Patent Number: 4,737,250

[45] Date of Patent: Apr. 12, 1988

[54] PROCESS FOR REGENERATING ELECTROLYTES

[75] Inventors: Hans-Joachim Konietzni, Gladbeck; Wilhelm Götzelmann, Stuttgart; Ulrich Borgs, Monchen-Gladbach, all of Fed. Rep. of Germany

[73] Assignees: AEG-Elotherm GmbH, Remscheid-Hasten; Rheinmetall GmbH, Dusseldorf, both of Fed. Rep. of Germany

[21] Appl. No.: 936,839

[22] Filed: Dec. 2, 1986

[30] Foreign Application Priority Data

Dec. 4, 1985 [DE] Fed. Rep. of Germany ....... 3542819

[51] Int. Cl.$^4$ .................................................. C25F 3/02
[52] U.S. Cl. ............................................... 204/129.75
[58] Field of Search ....................... 204/129.75, 129.8

[56] References Cited

FOREIGN PATENT DOCUMENTS 2622928 11/1976 Fed. Rep. of Germany ...................... 204/129.75

*Primary Examiner*—T. M. Tufariello
*Attorney, Agent, or Firm*—Dennis P. Clarke

[57] ABSTRACT

The invention refers to a process for regenerating electrolytes containing sodium nitrate for use in the electrochemical working of metallic workpieces within the pH range from 4 to 12.

Iron (III) nitrate is added to the electrolyte in the working cycle in such an amount that the hydrolysates are predominantly precipitated in coarse flocculent form. Flocculents may be added to the electrolyte.

2 Claims, No Drawings

PROCESS FOR REGENERATING ELECTROLYTES

BACKGROUND OF THE INVENTION

The invention relates to a process for regenerating electrolytes which contain sodium nitrate and are used for the electrochemical working of metallic workpieces within the pH range from 4 to 12, preferably from 6 to 9.

The electrochemical working of workpieces made of unalloyed or low-alloyed steel gives rise to coarsely flocculent metal hydrolysates, chiefly iron(III) hydroxide, which can easily be separated from the electrolyte by centrifuging or coagulating by means of flocculants.

In the case of other materials such as aluminium or alloyed steel, the metal hydrolysates, in particular of aluminium, iron, nickel and chromium, are largely obtained in very finely disperse form. Even by adding flocculating aids it is impossible to coagulate particles of adequate size which can be separated from the electrolyte by centrifugation, filtration or sedimentation.

It is an object of the present invention to separate out, by suitable measures, the very finely disperse metal hydrolysates produced in electrolytes which contain sodium nitrate in the working of metallic workpieces in such a coarsely flocculent form that they are readily filterable, sedimentable and centrifugable.

SUMMARY OF THE INVENTION

This object is achieved according to the invention by adding iron(III) nitrate to the electrolyte. The added iron(III) nitrate undergoes hydrolysis in the indicated pH range from 4 to 12, preferably 6 to 9, causing the formation of coarsely flocculent particles which bind the finely disperse portions by adsorption or inclusion. These precipitates are readily filterable, sedimentable and centrifugable. Towards the outside they have the character of iron(III) hydroxide. The advantage of the regenerative treatment of electrolytes based on sodium nitrate according to the invention is in particular that the hydrolysis of iron(III) nitrate takes place by itself in the indicated pH range.

A further enlargement of the flocs produced can be obtained by the preferred addition of flocculating aids.

DETAILED DESCRIPTION OF THE INVENTION

The amount of iron(III) nitrate and if desired flocculating aid to be added to the electrolyte must be adapted to the amount of metal hydrolysate obtained in the particular case, and has to be determined empirically. On average, an amount of iron(III) nitrate of 10 to 100 mg of Fe/l of electrolyte will be sufficient. Flocculating aids, for example based on polyacrylate or polyacrylamide, can be added as a 0.1 to 0.5% strength solution in water in an average amount of 0.5 to 3 ml/l.

By measuring the electric power, which is a measure of the removal of metal, it is possible to meter in the iron(III) nitrate which is to be added to the electrolyte in the work circulation system in a controlled manner. The addition of the iron(III) nitrate is expediently effected in the service reservoir or in a separate circulation system connected thereto, in which the precipitated hydrolysate is likewise removed.

I claim:

1. A method for regenerating electrolytes containing sodium nitrate which are used in the electrochemical working of metal workpieces within a pH range of from 4 to 12 comprising adding ferric nitrate to said electrolyte in an amount such that hydrolysates produced during said electrochemical working are precipitated predominantly in coarsely flocculent form.

2. A method according to claim 1 wherein a flocculating aid is also added to said electrolyte.

* * * * *